United States Patent [19]

Coles et al.

[11] 3,955,611

[45] May 11, 1976

[54] AWNING CONSTRUCTION

[75] Inventors: John W. Coles, Dolton; Dean F. Kneips, Chicago, both of Ill.

[73] Assignee: C & K Sales Corporation, Dolton, Ill.

[22] Filed: Aug. 5, 1970

[21] Appl. No.: 61,329

[52] U.S. Cl. .............................. 160/67; 160/243; 160/316; 160/317
[51] Int. Cl.² ......................................... E04F 10/06
[58] Field of Search .................. 160/45, 46, 62, 66, 160/67, 243, 316, 317

[56] References Cited
UNITED STATES PATENTS

| | | | |
|---|---|---|---|
| 748,641 | 1/1904 | Newell | 160/317 X |
| 1,266,716 | 5/1918 | Rolland | 160/317 X |
| 2,982,352 | 5/1961 | Nelson | 160/62 |
| 3,263,735 | 8/1966 | Vecchiarelli et al. | 160/67 X |

Primary Examiner—Philip C. Kannan
Attorney, Agent, or Firm—Anthony S. Zummer

[57] ABSTRACT

An awning construction particularly adapted for mounting on a mobile home. The awning includes an awning shade having one end fixed to an outside wall of the mobile home, and the other end of the awning shade is attached to an awning roller, which roller is pivotedly connected to the same outside wall. The awning roller includes an elongated torque rod which is nonrotatably connected to a pair of support arms. The support arms are pivotedly connected to the outside wall. A tube is rotatably mounted on the torque rod and is secured to the other end of the awning shade. A torsion spring connects the torque rod with the tube to rotate the tube relative to the torque rod and holds the tube up against the wall of the mobile home in its normal condition. A lock releasably locks the tube relative to the torque rod to allow the tube to stay selectively in an extended position away from the side wall.

4 Claims, 11 Drawing Figures

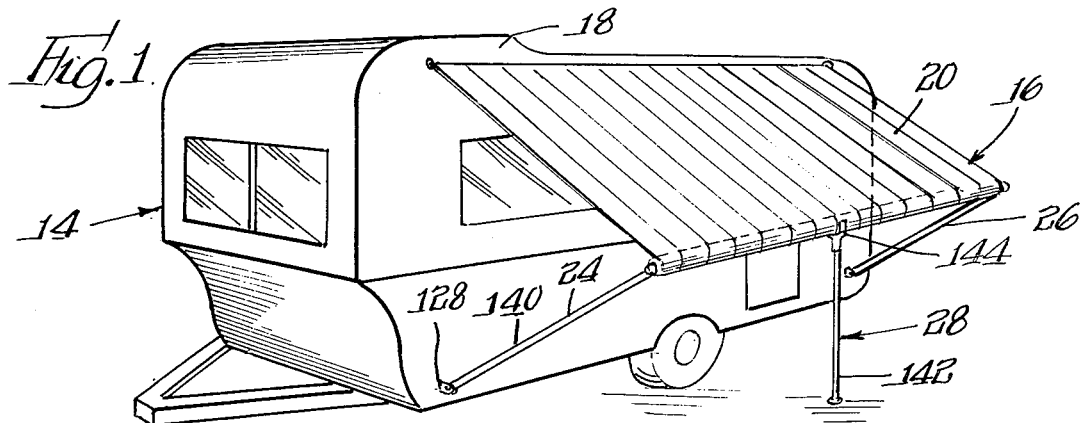
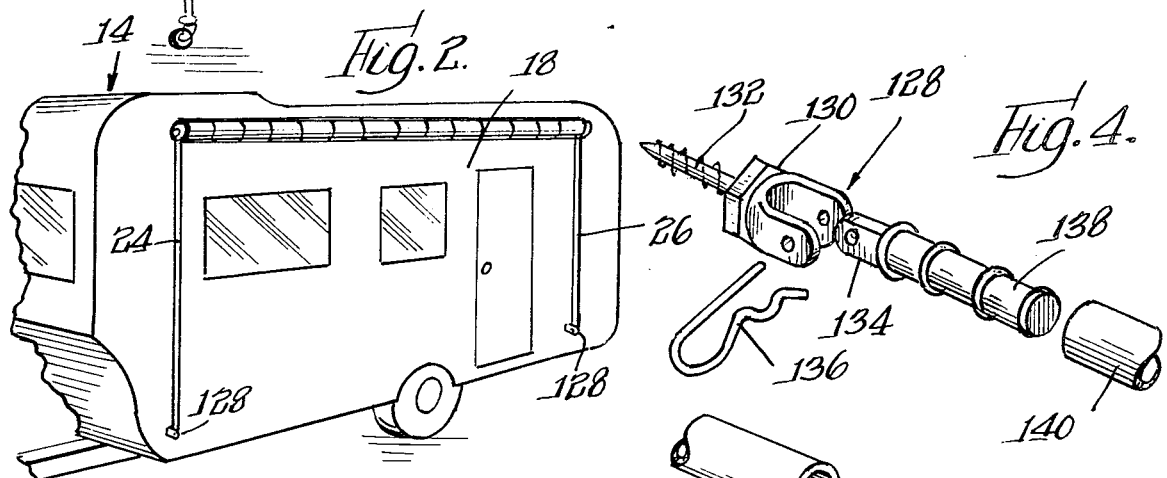
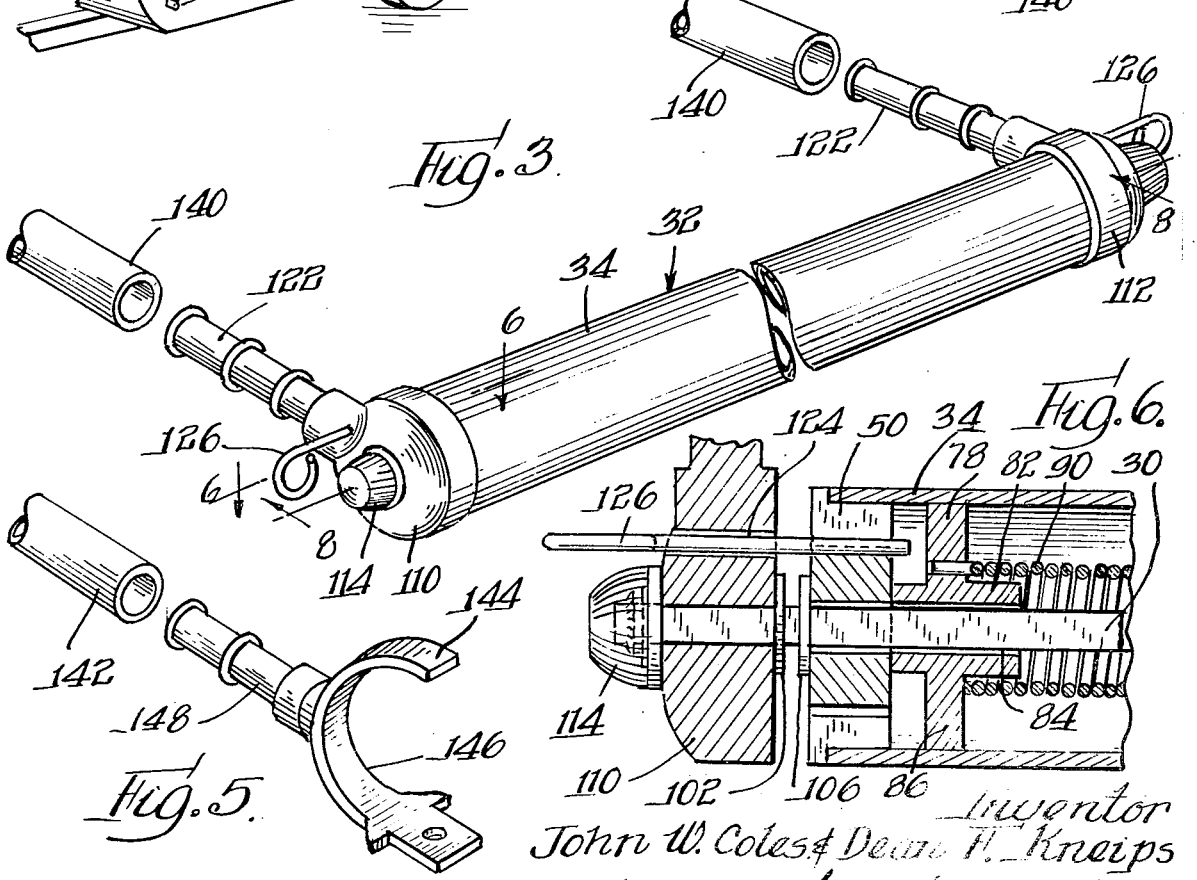

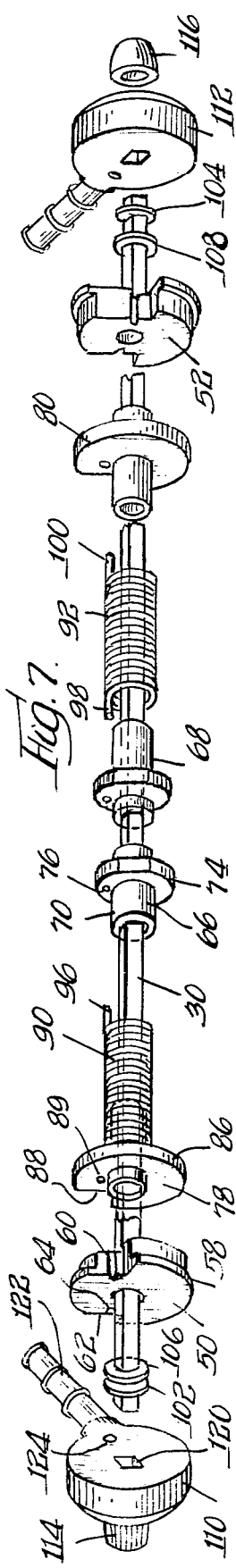
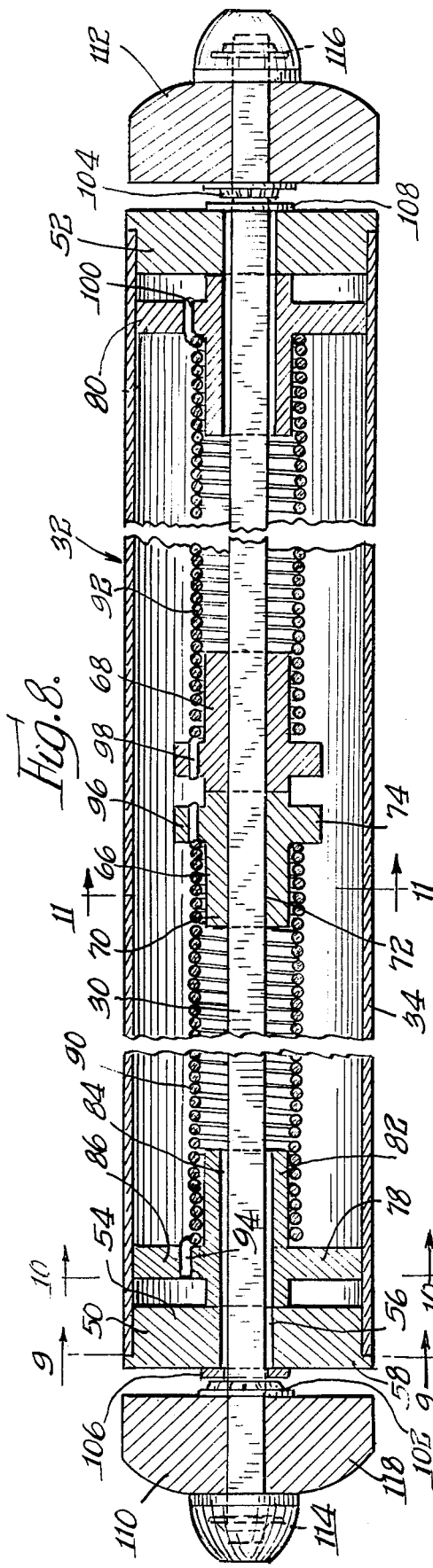

AWNING CONSTRUCTION

BACKGROUND OF THE INVENTION

Vacations have become longer and greater family affairs so that the cost of lodging for large families in many instances is prohibitive. To provide an inexpensive form of lodging for families away from home, house trailers or mobile homes have received a wide degree of acceptance. Furthermore, mobile homes have also received a wide degree of acceptance for many small families who desire inexpensive housing which may be selectively moved as desired. One of the disadvantages to the ordinary construction of a mobile home is that it does not have a porch or patio which may be used in connection with the mobile home. Moble homes, especially those which are used in warm climates, often have permanent or semi-permanent additions attached to the home which provide a covered area outside the mobile home but immediately adjacent thereto to function as a porch or patio. Obviously, those mobile homes which are used on vacations may not have a permanent or semi-permanent addition attached to the mobile home. It is clear that it is desirable to provide some sort of extension from the mobile home which may be utilized as a porch.

One popular approach for providing an extension to a mobile home is to provide a large awning along a substantial portion of the length of the mobile home. These awnings often attain the length of twenty feet so that when the mobile home is in position, the awning may be extended, thereby providing a porch or a seating arrangement exteriorally of the home but adjacent thereto. In many instances, the user of a mobile home attaches the awning to the mobile home every time the awning is to be put up. This creates several problems for the owner of the mobile home. He has to store the awning while he is traveling or while the awning is not in use. He must attach the awning and remove the awning when the mobile home is to be transported. One solution to the problems of attachment and storage of the awning is to attach permanently the awning to the mobile home and roll the awning on a roller. Rolling the awning on a roller solves many of the problems. However, there is still the difficulty of rolling up the awning when it is not in use and keeping the awning in a raised position when the mobile home is being transported.

SUMMARY OF THE INVENTION

The present invention provides an awning for use with a mobile home, which awning includes an awning shade which may be completely rolled up on a roller; and in its ordinary posture, the awning shade is held rolled up against the mobile home. One end of the awning shade is permanently secured to an exterior wall of the mobile home, and the construction of the awning roller is such that a spring force constantly pulls the awning shade into a rolled-up position so that the spring force keeps the roller up against the exterior wall of the mobile home when the awning is not in use. Thus, should a lock or other fastening device which may be utilized to hold the awning shade in a raised position fail, the spring force keeps the awning rolled up and does not allow the awning to fall down into a roadway during transportation of the mobile home.

The awning roller construction is such that when the awning roller is pulled down, the shade is unrolled against a spring force, which spring force constantly urges the roller up toward the mobile home. A lock is provided to hold the awning shade in an extended position. However, once the lock is released, the awning roller rolls up the shade, and the winding of the shade onto the roller moves the roller up against the exterior wall of the mobile home. The awning rollers, being long, have a tendency to be warped by a single spring in the awning roller. At least a pair of springs is utilized to provide the spring force, which pair is balanced so that the torsional force which is applied to the tube for rolling up the shade is balanced, thereby eliminating the distortion of the tube.

It is a principal object of the present invention to provide an awning construction which is easily mounted on a mobile home and which awning construction is such that the awning roller and shade stay in a rolled-up position up against a wall of the mobile home.

It is another object of this invention to provide an awning roller which has springs mounted in the roller for producing a balanced torque on a tube of the roller to minimize warpage of the tube.

It is still another object of the herein-disclosed invention to provide an inexpensive construction for an awning roller which may be easily assembled and used in conjunction with a mobile home.

Other objects and uses of the present invention will become apparent to those skilled in the art upon a perusal of the following specification in light of the accompanying drawings.

BRIEF DESCRIPTION OF THE DRAWINGS

FIG. 1 is a perspective view of a mobile home, shown with an awning embodying the present invention attached thereto, showing the awning in its extended position;

FIG. 2 is a perspective view of the mobile home shown in FIG. 1, but showing the awning in a raised or stored position;

FIG. 3 is an exploded fragmentary perspective view of a portion of an awning roller, which is part of the awning shown in FIGS. 1 and 2;

FIG. 4 is an exploded perspective view of a hinge connection for the awning shown in FIGS. 1 and 2;

FIG. 5 is an exploded fragmentary perspective view of a support for the awning shown in FIG. 1;

FIG. 6 is an enlarged cross-sectional view of portions of the roller taken on Line 6—6 of FIG. 3, showing a lock between a tube and a torque rod;

FIG. 7 is an exploded fragmentary perspective view of a portion of the interior construction of the awning roller shown in FIG. 3;

FIG. 8 is an enlarged fragmentary cross-sectional view taken on Line 8—8 of FIG. 3;

FIG. 9 is a cross-sectional view taken on Line 9—9 of FIG. 8;

FIG. 10 is a cross-sectional view taken on Line 10—10 of FIG. 8; and

FIG. 11 is a cross-sectional view taken on Line 11—11 of FIG. 8.

DESCRIPTION OF THE PREFERRED EMBODIMENT

Referring now to the drawings, and especially to FIG. 1, a house trailer or mobile home 14 is shown therein with an awning 16, embodying the instant invention, mounted on an exterior side wall 18. The awning 16 generally includes a fabric awning shade 20 having one end fixed to the wall 18 and the other end secured to an awning roller 22. The awning roller is connected to the wall 18 by a pair of arms 24 and 26, and a vertical support 28, engaging the ground, supports the central portion of the awning roller.

Looking now to FIGS. 7 and 8, the construction of the awning roller 22 is best seen therein. The awning roller includes an elongated torque rod 30 having a square cross section. The torque rod is made of a high strength steel. An elongated extruded aluminum shade tube 32 is rotatably mounted on the torque rod. The shade tube has a generally circular outside wall 34. An elongated box 36 is formed integrally with wall 34 and extends along the length of the tube. The box 36 includes a floor 38 and a side wall 40 extending into the interior of the tube to break the continuous circular configuration of the interior of the tube. The box also includes an outside side wall 42 with a lip 44 formed integral therewith. An enlarged lip 46 is formed integral with the outside wall 34 and the side wall 40. The lip 46 is spaced from the lip 44 to provide a shade slot 48 extending along the length of the tube to receive one end of shade 20.

The tube 32 has a pair of bearings 50 and 52 mounted in opposite ends thereof to support rotatably the tube on the torque rod 30. The construction of the bearings 50 and 52 is identical. Each of the bearings has a bearing body 54 with a circular rod aperture 56 formed in the central portion thereof for rotatably receiving the rod 30. The body 54 has a flange 58 formed integrally therewith for engagement with the end of the tube 32. Each bearing has a pair of recesses 60 and 62. These recesses 60 and 62 each may receive a portion of the box 36 so that it is not necessary to have right and left bearings, but either bearing may be used in either end. The recesses 60 and 62 allow the bearing to be non-rotatably mounted in the tube 32 so that the bearings rotate with the tube; and should the bearings be prevented from rotating relative to the rod 30, so should the tube 32. A pin opening 64 is provided adjacent to each of the recesses for reasons which will become apparent hereinafter.

Slideably mounted on the torque rod is a pair of aluminum spring-to-rod fasteners 66 and 68. Each of the fasteners has an identical construction. Each has an elongated fastener body 70, which has a square opening 72 extending therethrough. The rod 30 is mateably mounted in the square openings 72 so that there is no relative rotation between the fasteners 66 and 68 and the rod, though the fasteners 66 and 68 may be slipped on the rod to facilitate assembly of the roller. A spring flange 74 is formed integral with the body 70 adjacent to one end. The flange 74 has a diameter less than the distance from the center of the tube to the floor 38 so that the flange clears the box 36 and may rotate freely in the tube. A spring opening 76 is provided in the flange 74.

A pair of aluminum spring-to-tube fasteners 78 and 80 is rotatably mounted on the rod 30 adjacent to bearings 50 and 52, respectively. The fasteners 78 and 80 each have a substantially identical construction except that they are mirror images of each other since right and left fasteners are required. Each fastener includes an elongated tubular fastener body 82 which has an axial circular aperture 84 formed therein for rotatably receiving the rod 30. A flange 86 is formed integral with the body 82 and extends to the interior of the tube 36 for a substantial mating with the tube. The flange 86 has a recess 88 for receiving the box 36 to prevent rotation of the fastener relative to the tube. The flange 86 also has a spring aperture 89 extending therethrough.

A pair of oppositely wound helical torsional springs 90 and 92 are mounted in the tube surrounding the torque rod 30. The spring 90 has an ear 94 mounted in the spring aperture 89 of the spring-to-tube fastener 80 and a second ear 96 mounted in the spring opening 76 of the spring-to-rod fastener 66. The other spring 92 has an ear 98 positioned in the spring opening 76 of the spring-to-rod fastener 68 and an ear 100 mounted in the spring aperture 89 of the spring-to-tube fastener 80. As was mentioned above, the two springs 90 and 92 are wound in opposite directions so that they are connected to the tube and rod in opposite directions, that is, the ends of the springs connected to the rod are adjacent to each other in this instance, and the ends connected to the tube are spaced away from each other. Thus, the torsional forces on the tube are balanced, and the tendency to twist the tube out of shape is minimized, and the tendency to twist the rod is also reduced. It may be appreciated that although only two springs are shown herein, for longer roller constructions a number of pairs of springs may be mounted within the tube to provide a balanced torque to the tube.

To hold the parts in relation to each other, a pair of lock washers 102 and 104 are fixed to the rod adjacent to the bearings 50 and 52, respectively. Washers 106 and 108 are positioned between the bearings 50 and 52 and their respective lock washers to allow the tube to turn freely on the rod.

A pair of aluminum trim caps 110 and 112 are mounted on the opposite ends of the torque rod 30 and are held in position by trim cap buttons 114 and 116. The trim caps 110 and 112 each have an identical construction in that each has an enlarged head 118 with a square aperture 120 extending therethrough to receive non-rotatably the torque rod 30. An extension arm 122 is formed integral with the head 118 and extends radially from the head. A lock pin aperture 124 is formed in the head and extends therethrough to receive a lock pin 126 for locking the tube relative to the rod.

The arms 24 and 26 are identical in their construction. They are connected to the wall 18 by hinges 128. The construction of the hinges is best seen in FIG. 4. The hinge 128 includes a clevis 130 having a screw threaded portion 132 for screwing that portion into the wall 18. An anchor plate 134 is connected to the clevis 130 by a keeper pin 136. The anchor plate is connected to a plate extension arm 138 which is positioned in tubular rod 140. The other end of the tubular rod 140 is connected to the arm 122, as may be seen in FIG. 3, to complete the arm. The vertical support 28 is shown in FIG. 5 and includes a hollow rod 142 which has secured thereto a yoke 144. The yoke 144 includes a head 146 with an extension arm 148 which fits into the hollow rod 142 and is fixed thereto. The head 146 has a generally J-shaped cross-section for receipt of the roller 22.

From the foregoing description, it may be readily seen how the roller may be simply and easily assembled. The spring-to-rod fasteners 66 and 68 are slipped onto the torque rod 30. The springs 90 and 92 are then slipped onto the rod and placed into engagement with the fasteners. The spring-to-tube fasteners 78 and 80 are then slipped onto the rod and placed into engagement with the springs. The bearing 50 is then positioned in one end of the tube 32, and the rod with the fasteners and springs mounted thereon is slipped into the tube with the rod sliding through the rod aperture 56 in the bearing. The bearing 52 is then placed over the rod and positioned in the other end of the tube. The rod is then centered in the tube, and the washers 106 and 108 are placed into position. The lock washers 102 and 104 are then placed over the ends of the rod to lock the bearings into position in the tube and thereby hold the remainder of the pieces in position. The trim caps and the trim cap buttons are then mounted. It may be seen how the roller may be simply and easily assembled. Although one particular method of assembly has been set forth in detail herein, it is readily apparent that the roller may be assembled in other manners which are particularly suitable for a given assembly operation.

The awning 16 is mounted on a wall 18 of the house trailer 14. One end of the shade 20 is fixed to the wall 18, and the other end of the shade 20 is secured to the roller 22. The other end of the shade has a hem 150 stitched thereto with a holding rod 152 positioned in the hem, as shown in FIG. 9. The rod with the hemmed end of the shade is positioned in box 36 with the shade extending through slot 48 so that the shade is releasably secured to the roller. Though the shade is made of canvas, any other suitable material may be used.

When the awning is mounted on the house trailer, the roller is initially rolled so that there is tension on the springs to hold the roller up against the side wall. The awning may be easily mounted on the house trailer since it is necessary only to roll the shade onto the roller with the roller slightly tensioned, then secure the hinges 128 to the side wall 18 by screwing the clevises 130 into the side wall. The anchor plates 134 are positioned within the clevises, and the keeper pins 136 then hingedly secure the anchor plates to the clevises. The roller is pivoted up on the arms 24 and 26, and one end of the shade is secured to the side wall 18 by appropriate fastening means.

Once the awning is in position, the tension of the springs 90 and 92 holds the roller up in position. Although other fastening devices may be utilized to keep the awning up, it is apparent that even should those fastening devices fail, the tension of the springs keeps the awning in a raised position. In order to lower the awning, the operator simply pulls down on the arms 24 and 26 to lower the awning. As the shade is pulled out, it rolls the tube 32 about the torque rod 30 and tightens up the springs 90 and 92 since one end of each spring is connected to the tube and the other end is connected to the rod. When the shade is completely extended, a lock pin 126 is placed through the lock pin aperture 124 in each head 118 and extends through the head and into the pin opening 64 of the adjacent bearing. It may be appreciated that the pin 126 extending through the head 118 into the bearing prevents the tube 32 from rotating relative to the rod 30. Thus, there is a firm lock between the torque rod and the tube. It may be further appreciated that the torque of the springs tends to hold the lock pin 126 securely in position. The vertical support 28 is placed into position with the head 144 engaging the tube 32 to support the central portion of the tube. This prevents undue stress from being placed on the shade 20. In order to raise the awning, it is a simple matter for the operator to remove the lock pins 126 so that the force of springs 90 and 92 rotate the tube 32 relative to the torque rod, thereby rolling the shade 20 onto the tube and thereby raising the awning until the roller with the shade wound thereon comes into engagement with the side wall 18. The vertical support 28 then may be stored in an appropriate location in the house trailer.

In the foregoing description, it may be seen that the balanced torsion springs in the roller provide a contruction wherein there is minimum warpage of the tube or the torque rod. It is readily apparent that the present awning construction is one in which the shade may be raised and lowered with a great deal of facility, and the awning stays up for transportation of the house trailer from one location to another.

Although a specific construction has been shown and described herein and specific materials have been disclosed, it is to be expressly understood that the specific disclosure has been made herein for the purposes of making a complete disclosure of the present invention. It is readily apparent that those skilled in the art may make various modifications in the construction of the present device and substitute other materials for the materials disclosed herein without departing from the spirit of the instant invention. It is to be expressly understood that the present invention is limited only by the appended claims.

What is claimed is:

1. An awning construction comprising, a pair of support arms, each of said arms having one end adapted for attachment to a mobile home, a torque rod having opposite ends non-rotatably connected to the other end of each of said arms, a spring having one end non-rotatably connected to the torque rod, a tube rotatably mounted on the torque rod and being non-rotatably connected to the other end of the spring, a second spring having one end connected to the torque rod and the other end connected to the tube, said first-mentioned spring and the second spring being helically wound springs and surrounding the torque rod, said first-mentioned spring being wound in one direction and the second spring being wound in the opposite direction to provide a balanced torque between the tube and the torque rod, a lock for releasably locking the tube to the torque rod to prevent rotation therebetween, an awning shade having one end secured to the tube and the opposed end secured to the wall of the mobile home, said tube having an elongated box along its length having a slot therein for receipt of one end of the awning shade for connecting the awning shade to the tube, and a pair of bearings mounted in opposite ends of the tube for rotatably engaging the torque rod, a pair of spring-to-rod fasteners slideably mounted on the torque rod in non-rotating engagement with the torque rod, each of said spring-to-rod fasteners being connected to one end of each of the springs, a pair of spring-to-tube fasteners slideably mounted in the tube and non-rotatably engaging said tube, each of said spring-to-tube fasteners being fixed to the other end of each of the springs, and a pair of trim caps non-rotatably engaging opposite ends of the rod.

2. A roller for use in an awning comprising, an elongated torque rod having a non-circular cross-section, a shade tube rotatably mounted on the torque rod, a spring having one end connected to the tube and the other end connected to the rod to urge relative rotation between the tube and the rod, a second spring having one end connected to the torque rod and the other end connected to the tube, the first-mentioned spring and the second spring are helically wound springs and surround the torque rod, said first-mentioned spring being wound in one direction and the second spring being wound in the opposite direction to provide a balanced torque between the tube and the torque rod, a lock releasably holding the tube relative to the torque rod to prevent rotation therebetween, and a pair of spring-to-rod fasteners having an aperture slideably and mateably receiving the torque rod, said springs being fixed to respective spring-to-rod fasteners 3. A roller for use in an awning comprising, an elongated torque rod, a shade tube rotatably mounted on the torque rod, a spring having one end connected to the tube and the other end connected to the rod to urge relative rotation between the tube and the rod, a second spring having one end connected to the torque rod and the other end connected to the tube, the first-mentioned spring and the second spring are helically wound springs and surround the torque rod, said first-mentioned spring being wound in one direction and the second spring being wound in the opposite direction to provide a balanced torque between the tube and the torque rod, a lock releasably holding the tube relative to the torque rod to prevent rotation therebetween, a pair of bearings mounted in opposite ends of the tube for rotatably engaging the torque rod, a pair of spring-to-rod fasteners slideably mounted on the torque rod in non-rotating engagement with the torque rod and connected to one end of respective springs, and a pair of spring-to-tube fasteners slideably mounted in the tube and non-rotatably engaging said tube and being fixed to the other end of the respective springs.

4. A roller for use in an awning adapted for mounting on a mobile home as described in claim 3 wherein the tube includes an elongated box along its length having a slot therein for receipt of one end of an awning shade for connecting the awning shade to the tube, and including a pair of trim caps non-rotatably engaging opposite ends of the torque rod, and each of the trim caps including an extension arm for engagement with a support arm.

* * * * *